UNITED STATES PATENT OFFICE.

ORLANDO M. THOWLESS, OF NEWARK, NEW JERSEY.

PROCESS OF EXTRACTING ALUMINIUM.

SPECIFICATION forming part of Letters Patent No. 370,220, dated September 20, 1887.

Application filed July 12, 1886. Serial No. 207,791. (Specimens.)

*To all whom it may concern:*

Be it known that I, ORLANDO M. THOWLESS, a subject of the Queen of Great Britain, residing at Newark, in the county of Essex and State of New Jersey, have invented a new and useful Improvement in the Extraction of Aluminium, of which the following is a specification.

Prior to my invention it has been common to produce aluminium by first forming a chloride of aluminum, producing the same by treating alumina with a stream of chlorine gas, and then producing aluminum therefrom by the use of metallic sodium as a reagent. Another method has been to place the chloride of aluminum and sodium-producing materials in separate chambers and to produce the aluminium by the vapor of the sodium being brought into contact with the chloride at a certain point in the process.

By my invention I reduce the cost of producing aluminium by dispensing with the use of the metallic sodium, and I also simplify the process and make the result more certain by subjecting the mixture of the aluminum chloride and the sodium-producing materials to heat in a preferably closed vessel. I do not depend upon the vapor of sodium acting at a critical point in the operation upon the chloride, as previously practiced, for all the ingredients I use are brought into intimate contact by being mixed and placed in one vessel or chamber, and in this way the vapor of sodium is bound to act upon the chloride, while in the former method, where the sodium-producing substances and the chloride of aluminium are placed in separate chambers and subjected to heat, the success of the operation depends upon the sodium-vapor acting upon the chloride of aluminium in such a manner as to extract the chlorine therefrom, forming chloride of sodium and setting metallic aluminium free. The uncertainty of this method is that when chloride of aluminium is heated chlorine gas is given off, which forms with the sodium-vapor chloride of sodium; but the fact of the chlorine passing away from the chloride of aluminium leaves it not in metallic shape, but as oxide of aluminium, which, in the continuation of the process of heating, the sodium-vapor still being generated has no effect upon.

In my process I may employ any suitable chloride of aluminium which is comparatively free from iron. Instead of employing chloride of aluminium, I may use double chloride of aluminium and sodium, or fluoride of aluminium, or double fluoride of aluminium and sodium, as I regard these as the equivalents of the chloride of aluminium, in carrying out my process. I, however, preferably use a chloride of aluminium made in the following manner, viz: by dissolving freshly-prepared alumina in hydrochloric acid and evaporating the same, as hereinafter set forth.

In employing this method of preparing the chloride I dissolve in water a soluble salt of alumina and add sufficient a cidor alkali, as the nature of the dissolved salt may require, in order to cause a precipitate to fall, such precipitate being what is known as "aluminium hydrate." In the case of using aluminate of soda, aluminate of potash, or other soluble alkaline salt of alumina, sufficient hydrochloric or other suitable acid is added to the solution to obtain the precipitate. In the case of using sulphate, nitrate, or acetate of alumina, or other soluble acid salt of alumina, sufficient alkali is added to the solution to obtain the precipitate. The precipitate is well washed, and after drying in any convenient manner dissolved as soon thereafter as possible in hydrochloric acid. This acid solution is subsequently evaporated, so that the necessary aluminum chloride is obtained. In my process of reducing aluminium I dispense with the use of metallic sodium, and substitute therefor substances which during the reduction combine to form the sodium necessary for the reduction of the aluminium from its chloride.

In practicing my invention the aluminum chloride is mixed with carbonate of soda or soda-ash and chalk and small coal, or other carbonaceous substances (as, for example, tar, bitumen, asphaltum, molassses, &c.,) in varying proportions. I do not, however, confine myself to the materials above mentioned, as any suitable sodium-producing materials may be mixed with the aluminum chloride.

In forming the mixture the following proportions are found to work well in practice: ten parts, by weight, of aluminum chloride; three parts, by weight, of chalk; ten parts, by weight, of coal or its substitute, and ten parts, by weight, of carbonate of soda or soda-ash. I prefer to add to the above one part, by weight, of cryolite to serve as a flux. The latter may be omitted, however, or be replaced by any other suitable flux without materially altering the result.

The mixture above described is placed in a suitable vessel in a furnace, a temperature being maintained of, say, 2,000° Fahrenheit, (more or less,) and the said vessel may preferably be kept closed to prevent the escape of the gases. After the reduction is completed the mixture is removed from the furnace, and when cold may be ground and washed to remove the carbon and other foreign matter from the aluminium. The latter can then be remelted and formed into ingots of any suitable size or shape.

In addition to the prior methods hereinbefore mentioned, I understand that alum dissolved in hot water and mixed with carbonate of soda has been, after evaporation, mixed with pulverized charcoal and common salt, and that this mixture has been subjected in a vessel to heat for the purpose of obtaining aluminum; but such a mixture and method is entirely different from and forms no part of my invention.

Having thus described my invention, what I claim, and desire to secure by Letters Patent, is—

1. The process of producing aluminium, which consists in mixing aluminum chloride with sodium-producing substances, substantially as described, and then heating the mixture in a vessel or receptacle, and then grinding and washing, substantially as described.

2. The process of producing aluminium, which consists in mixing aluminum chloride with sodium-producing substances, substantially as described, and then heating the mixture in a vessel or receptacle, substantially as described.

ORLANDO M. THOWLESS.

Witnesses:
    DANIEL F. BYRNE,
    C. C. HERRICK.